(12) United States Patent
    Wu

(10) Patent No.: US 9,589,749 B1
(45) Date of Patent: Mar. 7, 2017

(54) FINGER ACTIVATED SWITCHING DEVICE

(71) Applicant: Qiankun Wu, Moreno Valley, CA (US)

(72) Inventor: Qiankun Wu, Moreno Valley, CA (US)

(*) Notice: Subject to any disclaimer, the term of this patent is extended or adjusted under 35 U.S.C. 154(b) by 148 days.

(21) Appl. No.: 14/561,127

(22) Filed: Dec. 4, 2014

Related U.S. Application Data

(60) Provisional application No. 61/916,183, filed on Dec. 14, 2013.

(51) Int. Cl.
    *H01H 21/24* (2006.01)

(52) U.S. Cl.
    CPC ....... *H01H 21/24* (2013.01); *H01H 2221/016* (2013.01); *H01H 2221/044* (2013.01); *H01H 2221/08* (2013.01); *H01H 2239/074* (2013.01)

(58) Field of Classification Search
    CPC ................................ H01H 3/04; H01H 21/24
    USPC ................................................ 200/332, 335
    See application file for complete search history.

(56) References Cited

U.S. PATENT DOCUMENTS

| 4,874,912 A | * | 10/1989 | Kakuta | H04M 1/08 200/16 D |
| 5,294,758 A | * | 3/1994 | Frankhouse | H01H 13/84 200/5 R |
| 5,549,370 A | * | 8/1996 | Folsom | F16F 1/3665 267/149 |

* cited by examiner

*Primary Examiner* — Edwin A. Leon
*Assistant Examiner* — Iman Malakooti
(74) *Attorney, Agent, or Firm* — Barry Choobin; Patent 360

(57) ABSTRACT

A finger activated switching device has an enclosure with a top wall and a bottom wall, the bottom wall movable on a supporting wall. An upper lever is pivotally joined to the enclosure, and is upwardly spaced apart from the top wall in a first rest position yet is upwardly displaceable using finger pressure from below. A lower lever is pivotally joined to the enclosure directly below the upper lever, and spaced apart from it in a second rest position yet is downwardly displaceable using finger pressure. When the levers are displaced from their rest positions a restoring element moves the levers back to their rest positions. Switching elements positioned in force transmission mechanisms with the levers provide electrical switching actions when the levers are displaced.

12 Claims, 5 Drawing Sheets

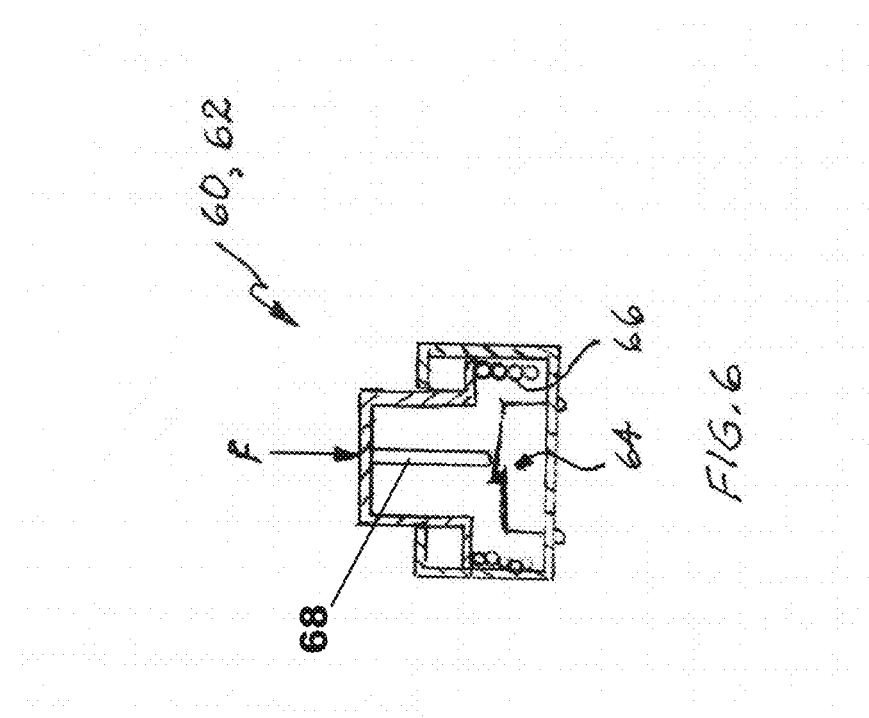
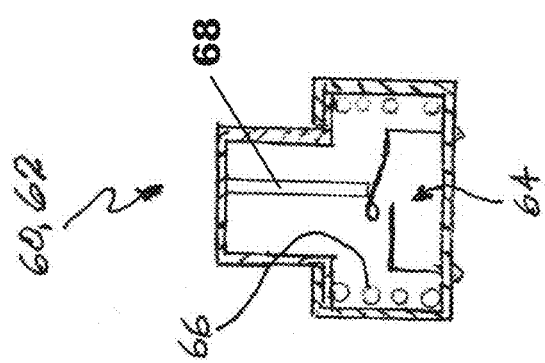
FIG. 6
FIG. 5

FINGER ACTIVATED SWITCHING DEVICE

RELATED APPLICATIONS

This application is related to provisional application 61/916,183 filed on Dec. 14, 2013, and being filed within one year claims international date priority thereof. The subject matter of provisional application 61/916,183 is hereby incorporated herein by reference in its entirety.

BACKGROUND AND FIELD OF THIS DISCLOSURE

In computing, a mouse is a pointing device that detects two-dimensional motion relative to a surface. This motion is typically translated into the motion of a pointer visible on a computer display which allows for fine control of a graphical user interface. Physically, a mouse consists of an enclosure held in one's hand on the surface, and has one or more buttons which may be pressed by the fingers of the hand holding the mouse. Mice often also feature other elements, such as touch surfaces and wheels which enable additional control and dimensional input. Mouse buttons are usually microswitches which can be pressed to interact with an element of a graphical user interface, and may produce a distinctive clicking sound. In typical use, after the pointer is positioned on screen by moving the mouse on the surface, a mouse button is pressed downwardly in a quick motion which, through software enablement invokes an expected computer action or result. Alternately, the button may be pressed downwardly twice (or even three times) in quick succession to invoke an expected software driven response. In a still further enablement with the traditional mouse, a button may be pressed down and held down until an expected time related response is achieved. The three-button scrollmouse has become the most commonly available design. As of 2007 (and roughly since the late 1990s), users most commonly employ the second button to invoke a contextual menu in the computer's software user interface, which contains options specifically tailored to the interface element over which the mouse cursor currently sits. By default, the primary mouse button is typically located on the left-hand side of the mouse enclosure while the secondary mouse button is located on the right-hand side.

BRIEF DESCRIPTION OF DRAWINGS

FIGS. 5 and 6 are conceptual diagrams of sectional side elevation views of an electrical switch thereof.

Like reference symbols in the drawing figures indicate like elements.

DETAILED DESCRIPTION

Embodiments illustrated in FIGS. 1-6 depict a finger activated switching device otherwise well known generically as a "computer mouse" and in this disclosure we use the term "mouse 10" to represent this described and illustrated switching device. It should be recognized that this finger activated switching device, mouse 10, may be adapted for use in other applications where finger movement activation of one or more electrical switching functions, for instance using switch 60 or switch 62 is desired or required. However, when used as a computer pointing device the presently described mouse 10 is intended to be used on a table top, mouse pad, or other supporting surface 20 for electronically moving a computer display screen pointer wherein such enablement is not shown or described herein, for instance, to a desired position on a computer screen (not shown), or for moving a graphical or text item to a desired position on said screen, for identifying a portion of text, and many other functions in visual screen operations well known in the art.

Figure 1:
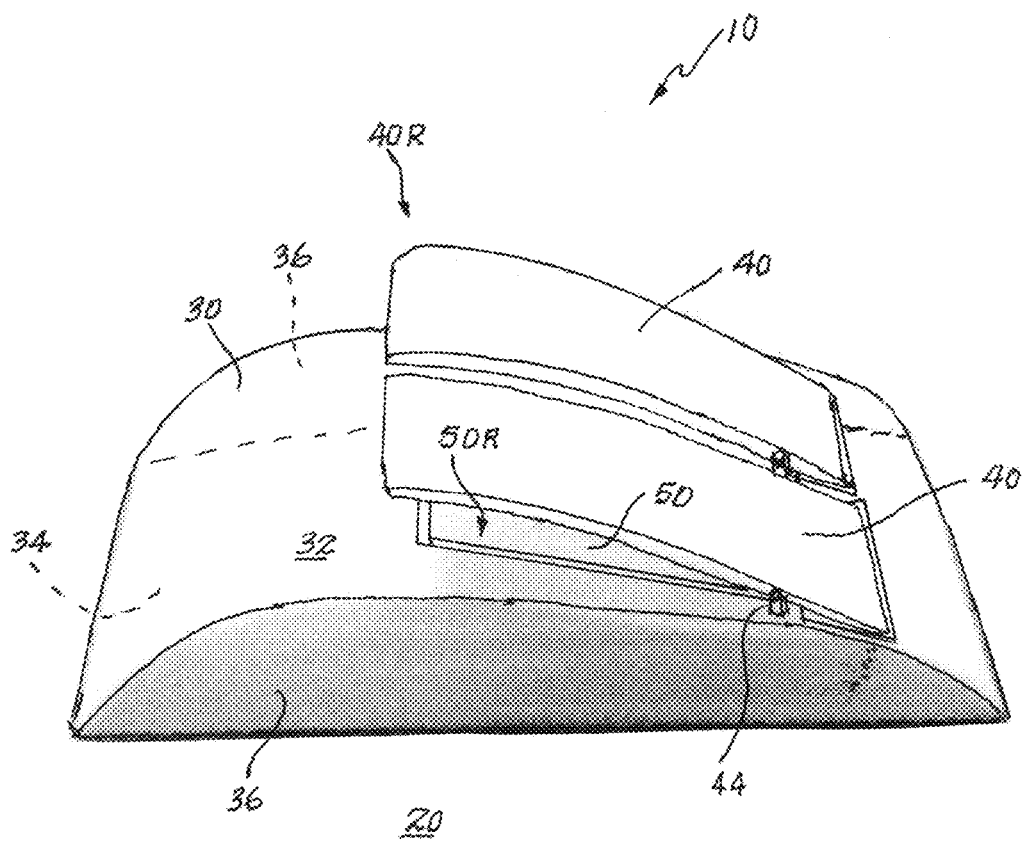
FIG. 1 is a perspective view of an embodiment of a computer mouse as described and illustrated herein.
Figure 2:
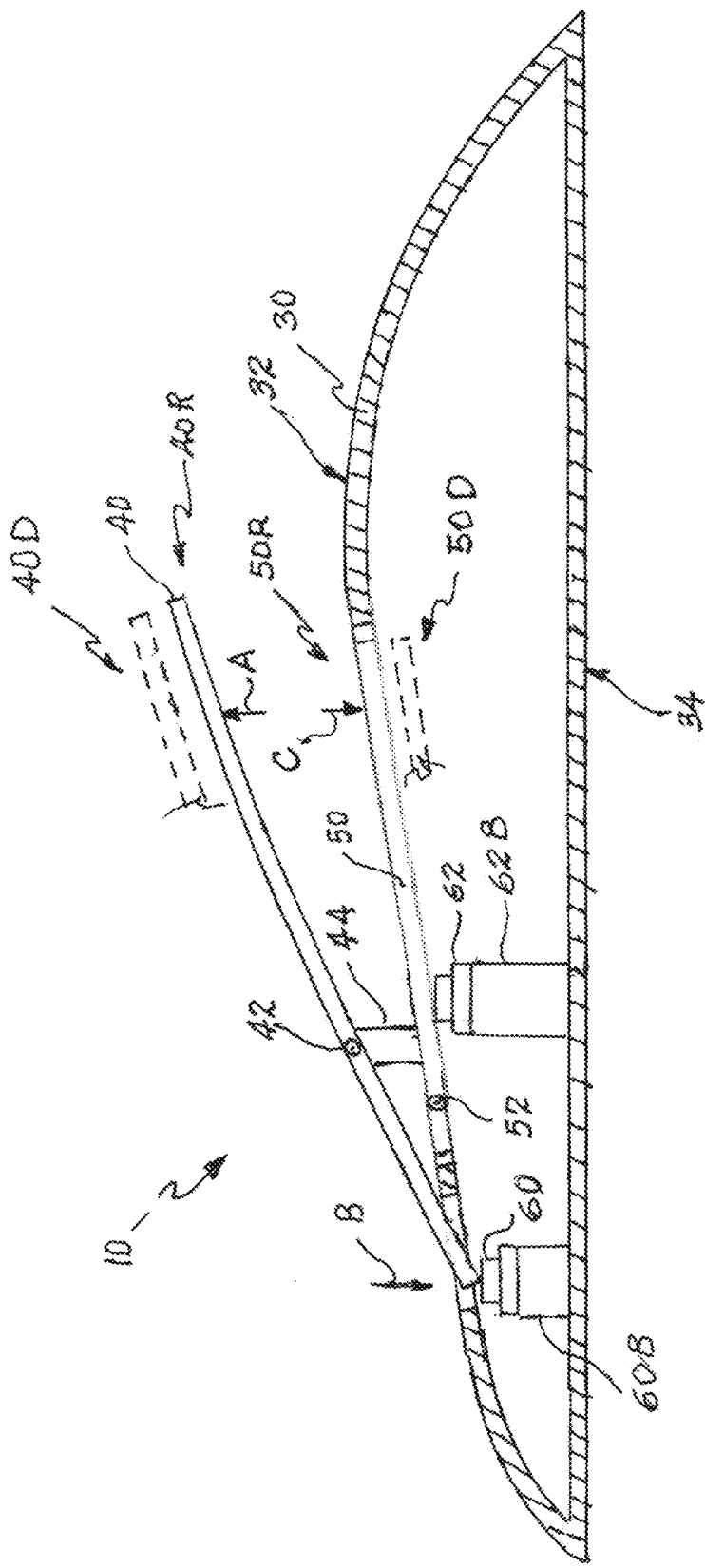
FIGS. 2-4 are conceptual diagrams of a sectional side elevation view thereof showing separate embodiments.

In an embodiment, as shown in FIGS. 1 and 2, mouse 10 may comprise a enclosure 30 which may be of molded plastic, for instance, and which may have a top wall 32 and a bottom wall 34 wherein said bottom wall 34 is intended to be rested on and be moved over said supporting surface 20 as is well known in the use of computer mice for computer visual screen operations. Enclosure 30 may have opposing side walls 36 so that walls 32, 34, and 36 form a mostly closed enclosure 30 which may be held in one hand as is typical of computer mice.

As also shown in FIGS. 1 and 2, an upper lever 40 may be supported by enclosure 30 by a first hinge 42 held by opposing standoffs 44, which standoffs may be attached at top wall 32 and extend upwardly therefrom, as shown. Upper lever 40 may be positioned above and apart from said top wall 32 in a first rest position 40R while alternatively being upwardly displaceable from rest position 40R by finger pressure below upper lever 40 in an upward motion shown by arrow "A" to thereby position one end of upper lever 40 in position 40D while the opposing end of upper lever 40 rotates downward as shown by arrow "B" and depresses a first switch 60 supported on block 60B. As clearly shown, upon the execution of this motion upper lever 40 rotates about first hinge 42. FIG. 5 shows an example of first switch 60 in its non-actuated state whereby electrical contacts 64 are open. FIG. 6 shows the same switch 60 with the electrical contacts 64 closed as force "F" is applied by finger pressure to upper lever 40. When finger pressure is removed, electrical contacts 64 open once more as spring 66 press upward to their non-compressed state and upper lever 40 resumes its rest position.

As further shown in FIG. 2, a lower lever 50 may be joined to enclosure 30 by a second hinge 52 held at its opposing ends directly by enclosure 30 at top wall 32. Lower lever 50 is normally positioned in a second rest position 50R while alternatively being downwardly displaceable from rest position 50R by finger pressure from above onto lower lever 50 in a downward motion shown by arrow "C" to thereby place one end of lower lever 50 in position 50D which therefore presses on second switch 62 which may be supported on block 62B which is clearly supported by bottom wall 34. As clearly shown, upon the execution of this motion lower lever 50 rotates about second hinge 42 actuating switch 62 and when finger pressure is removed from lower lever 50, spring 66 of switch 62 moves lower lever 50 back to said second rest position 50R.

In an embodiment, when finger pressure is released from levers 40 or 50 after a displacement motion, levers 40 or 50 immediately move back to their respective rest positions 40R or 50R as urged by a restoring element 45 which may be a spring or the like. For instance FIG. 5 shows that switches 60 and 62 may have a spring 66 wherein, once depressed and released, moves the levers 40 or 50 back to their rest positions 40R and 50R and allows switches 64 to open. Switches 64 may have a means for moving to the non-actuated state such as a spring loading or otherwise as would be known by those of skill in the electrical arts, or connector bar 68 may be attached to switch 64 so as to pull switch 64 into an open state.

Figure 3:
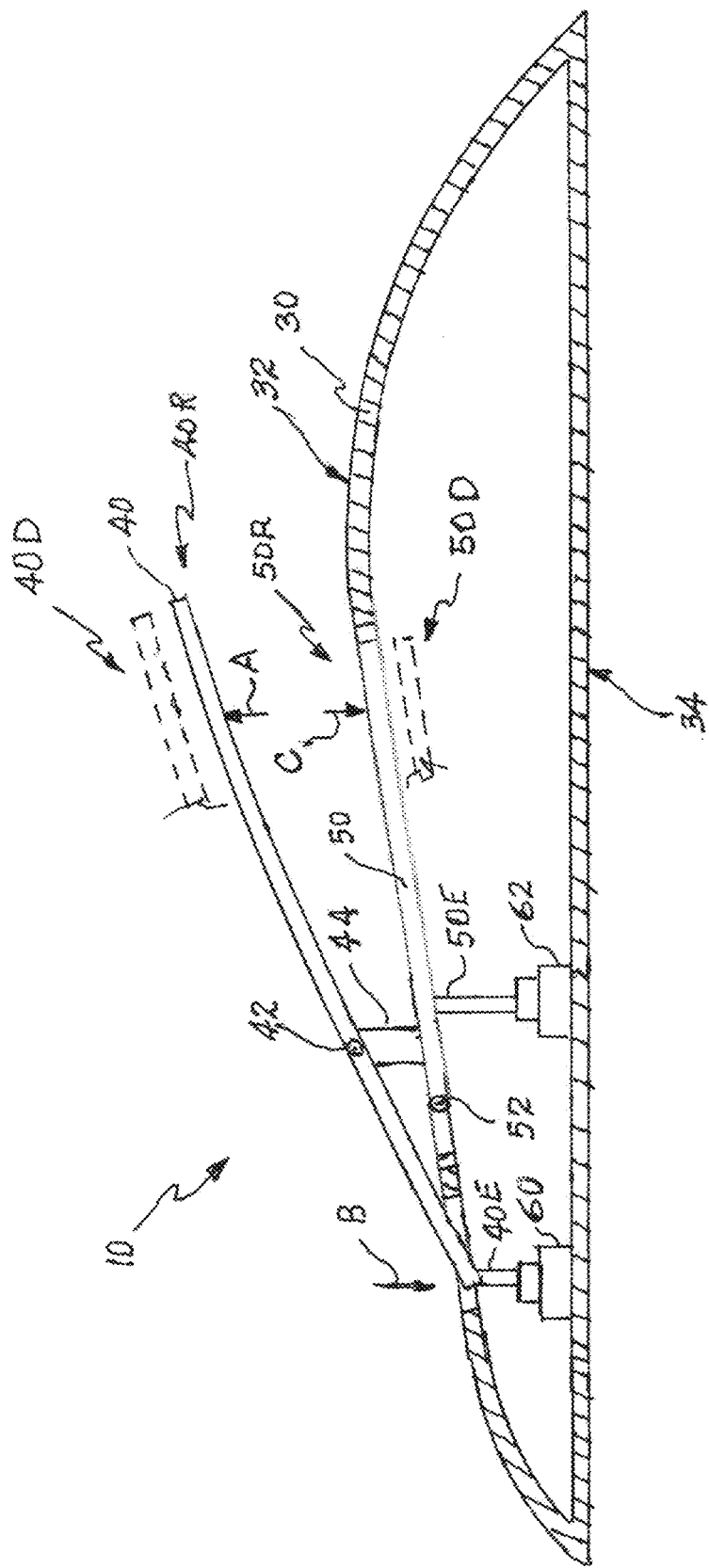

In an embodiment FIG. 3 shows that blocks 60B and 62B may be replaced by extension rods 40E and 50E which may be pinned and pivoted from their respective levers 40 and 50, or may be structural extensions thereof.

Figure 4:
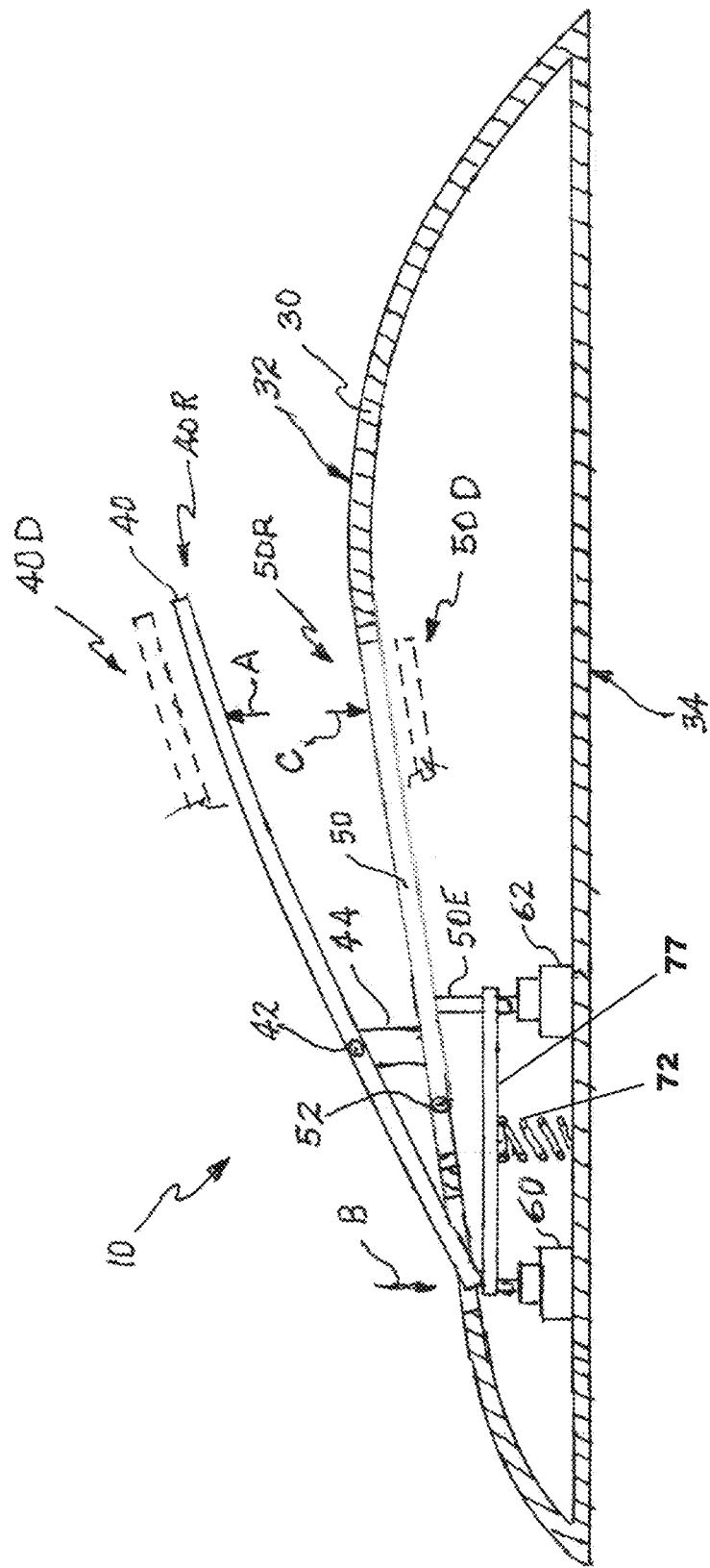

In an embodiment FIG. 4 shows that instead of blocks 60B and 62B or extension rods 40E of the embodiments shown in FIGS. 2 and 3, a pivotable platform 77 may be mounted on a spring 72 so that it may tilt to the left to actuate switch 60 when lever 40 is displaced, or tilt to the right to actuate switch 62 when lever 50 is displaced. Upon release of finger pressure on levers 40 and 50, spring 72 moves platform 77 back to the neutral position shown in FIG. 4 wherein platform 77 presses down on neither switch 60 nor 62.

The embodiments of FIGS. 2-6 are mechanical manifestations of the present apparatus which follow the same fundamental arrangement to accomplish the same result and are therefore physically and functionally enabled under the same inventive concept, but other manifestations or embodiments may be used in a similar manner to accomplish the same result. It should be understood, and is obvious that other mechanical arrangements identical or similar to the elements described above may be arranged so that displacement of either lever 40 or lever 50 would be able to actuate the same switch, that is when using only one switch 60 or 62 instead of two switches, and it is within the skill of those practicing the mechanical arts under the above description to activate one switch with either or both of levers 40 and 50.

It should be understood that said finger activated switching device (mouse 10) may have two or more sets of levers 40, 50 enabled, as described above, for switching multiple sets of switching elements 60 and 62. FIG. 1 illustrates an embodiment of mouse 10 having two sets of levers 40, 50 located in side-by-side positions, however, a plurality of more than two sets of levers 40, 50 with the same mechanical arrangements for actuating more than two sets of switches 60, 62 will be understood by those of skill.

Embodiments of the subject apparatus and method of use have been described herein. Nevertheless, it will be understood that modifications by those of skill in the art may be made without departing from the spirit and understanding of this disclosure. Accordingly, other embodiments and approaches are within the scope of the following claims.

What is claimed is:

1. A finger activated switching device comprising:
   an enclosure having a top wall and an opposing bottom wall;
   an upper lever, said upper lever pivotally supported by said top wall, and upwardly spaced apart therefrom in first rest position, said upper lever upwardly displaceable therefrom;
   a lower lever, said lower lever pivotally joined to said top wall, and positioned directly below said upper lever and spaced apart therefrom in a second rest position, said lower lever downwardly displaceable therefrom;
   a pair of restoring elements positioned and enabled to reposition said upper lever and said lower lever back to said rest positions when said levers are displaced therefrom;
   a pivotable element shared by both upper and lower levers wherein the upward or downward movements of the upper and lower levers correspondingly actuates the first and second switching elements; and
   a pair of switching elements wherein displacement of said levers enable said switching elements.

2. The finger activated switching device of claim 1 further comprising a platform supported by a pivotable element wherein when the upper lever is displaced upwardly the pivotable element is tilted in a first direction actuating a first one of said switching elements and when the lower lever is displaced downwardly the pivotable element is tilted in a second direction actuating a second one of said switching elements.

3. The finger activated switching device of claim 1 wherein with the upper lever displaced upwardly a first rod joined therewith is positioned for contact with a first switching element for completing a switching action thereof, and wherein with the lower lever displaced downwardly a second rod joined therewith is positioned for contact with a second switching element for completing a switching action thereof.

4. The finger activated switching device of claim 3 wherein said first and second switching elements are distinct.

5. The finger activated switching device of claim 1 wherein said restoring elements are springs.

6. The finger activated switching device of claim 1 wherein said restoring elements are material fibers within said levers.

7. A finger activated switching device comprising:
   an enclosure having a top wall and an opposing bottom wall;
   a plurality of mutually adjacent upper levers, said upper levers pivotally supported by said top wall, and upwardly spaced apart therefrom in first rest positions, said upper levers upwardly displaceable therefrom;
   a plurality of mutually adjacent lower levers, said lower levers pivotally joined to said top wall, said lower levers positioned directly below said upper levers and spaced apart therefrom in a second rest position, said lower levers downwardly displaceable therefrom;
   a plurality of restoring elements positioned and enabled to reposition said upper levers and;
   said lower levers back to said rest positions when said levers are displaced therefrom;
   a pivotable element shared by both upper and lower levers wherein the upward or downward movements of the upper and lower levers correspondingly actuates the first and second switching elements; and
   a plurality of switching elements wherein displacement of said levers enable said switching elements.

8. The finger activated switching device of claim 7 further comprising a plurality of platforms, wherein each said platform is supported by a pivotable element wherein when an upper lever is displaced upwardly one said pivotable element is tilted in a first direction actuating a first one of said switching elements and when a lower lever is displaced downwardly a pivotable element is tilted in a second direction actuating a second one of said switching elements.

9. The finger activated switching device of claim 7 wherein with an upper lever displaced upwardly a first rod joined therewith is positioned for contact with a first one of said switching elements for completing a switching action thereof, and wherein with a lower lever displaced downwardly a second rod joined therewith is positioned for contact with a second switching element for completing a switching action thereof.

10. The finger activated switching device of claim 9 wherein each said first and second switching elements are distinct.

11. The finger activated switching device of claim 7 wherein said restoring elements are springs.

12. The finger activated switching device of claim 7 wherein said restoring elements are material fibers within said levers.

\* \* \* \* \*